United States Patent [19] [11] 4,028,433
Prinz et al. [45] * June 7, 1977

[54] THERMOPLASTIC MOULDING COMPOUNDS

[75] Inventors: Richard Prinz, Leverkusen; Salah Elabd Elghani, Duesseldorf; Winfried Fischer; Heinrich Alberts, both of Cologne, all of Germany

[73] Assignee: Bayer Aktiengesellschaft, Germany

[ * ] Notice: The portion of the term of this patent subsequent to Nov. 2, 1993, has been disclaimed.

[22] Filed: June 30, 1975

[21] Appl. No.: 591,501

[30] Foreign Application Priority Data
July 4, 1974 Germany ............................ 243212

[52] U.S. Cl. ............................................... 260/873
[51] Int. Cl.² ......................................... C08L 67/06
[58] Field of Search ..................................... 260/873

[56] References Cited
UNITED STATES PATENTS
3,852,394 12/1974 Kubota et al. ..................... 260/873

OTHER PUBLICATIONS
B465,688, Jan. 1976, Prinz et al., 260/873.

Primary Examiner—J. Ziegler
Attorney, Agent, or Firm—Connolly and Hutz

[57] ABSTRACT

A thermoplastic moulding composition comprising:
1. from 5 to 95 % by weight, based on component (1) and (2), of a polycarbonate of a divalent phenol,
2. from 95 to 5 % by weight, based on component (1) and (2), of a graft copolymer comprising
   a. at least one monovinyl aromatic compound,
   b. acrylonitrile and/or at least one acrylonitrile derivative, and optionally
   c. a vinyl or allyl compound, on an ethylene/vinyl acetate copolymer as a graft substrate, and
3. from 10 to 50 % by weight, based on the total moulding composition, of a brittle thermoplastic resin.

3 Claims, No Drawings

THERMOPLASTIC MOULDING COMPOUNDS

The present invention relates to thermoplastic moulding compositions of
1. 5 – 95% by weight of polycarbonats of divalent phenols, and
2. 95 – 5% by weight of graft copolymers of
   a. at least one monovinyl aromatic compound,
   b. acrylonitrile and/or its derivatives and
   c. optionally a vinyl or allyl compound,
on ethylene/vinyl acetate copolymers, which contain additionally a brittle thermoplastic resin in a quantity of 10 – 50% by weight, based on the total quantity of moulding composition.

This moulding composition is much improved in its fluidity compared with polycarbonates and also has a much greater tracking resistance than polycarbonates.

Compared with known mixtures of polycarbonates and graft polymers of styrene and acrylonitrile on polybutadienes, these moulding compositions can be processed within a wider temperature range and have greater weather resistance.

Suitable polycarbonate components (1) for the moulding compositions are high molecular weight thermoplastic polycarbonates of divalent phenols, such as hydroquinone, resorcinol, 4,4'-dihydroxy-diphenyl, bis-(4-hydroxyphenyl)-alkanes, -cycloalkanes, -ethers, -sulphides, -sulphones and -ketones, bisphenols having a halogenated or alkylated nucleus and $\alpha,\alpha'$-bis-(p-hydroxyphenyl)-p-diisopropyl-benzene. Polycarbonates based on 4,4'-dihydroxy-diphenyl-propane-(2,2) (bisphenol A), tetrachloro-bisphenol A, tetrabromobisphenol A, tetramethyl-bisphenol A and tri-nuclear bisphenols such as $\alpha,\alpha'$-bis-(4-hydroxyphenyl)-p-diisopropylbenzene are preferred. The polycarbonates are prepared from the phenols in known manner by reaction with polycarbonate forming derivatives of carbonic acid, e.g. phosgene. Polycarbonates of this kind are already known and have been described in U.S. patent Specifications Nos. 3,028,365; 2,999,835; 3,148,172; 3,271,368; 2,970,137; 2,991,273; 3,271,367; 3,280,078; 3,014,891; and 2,999,846.

The polycarbonates used preferably have molecular weights of about 10,000 to 100,000, preferably 20,000 to 60,000, corresponding to a relative viscosity of 1.2 to 1.6 determined on a solution of 0.5 g of polycarbonate in 100 ml of methylene chloride at 25° C.

The graft polymer component (2) used for the moulding composition is a product prepared by the polymerisation of a monomer mixture of
   a. at least one monovinyl aromatic compound,
   b. acrylonitrile and/or its derivatives and
   c. optionally a vinyl or allyl compound, in the presence of ethylene/vinyl acetate copolymers.

The preparation of such products has been described in German Offenlegungsschriften Nos. 2,215,588 and 2,305,681.

Graft polymers obtained from the following components are particularly suitable for use in the moulding composition:
1. 10 – 70% by weight, preferably 15 – 40% by weight of an ethylene/vinyl acetate copolymer containing 25 – 75% by weight, preferably 30 – 55% by weight, of polymerised vinyl acetate as a graft substrate and
2. 90 – 30% by weight, preferably 85 to 60% by weight of a copolymer prepared in the presence of (1) from:

(2.1) 15 – 85 parts by weight, in particular 20 – 50 parts by weight of acrylonitrile, methacrylonitrile or mixtures thereof,
(2.2) 10 – 85 parts by weight, in particular 80 – 50 parts by weight of styrene, $\alpha$-methylstyrene or mixtures thereof,
(2.3) 0.1 – 20 parts by weight, in particular 0.1 – 5 parts by weight of at least one monoolefin,
(2.4) 0–20 parts by weight, in particular 0 – 5 parts by weight of at least one other vinyl compound and
(2.5) 0 – 10 parts by weight, in particular 0 – 5 parts by weight of at least one allyl compound.

Components (2.4) and (2.5) may generally be omitted but they may be added to produce special effects.

The graft polymers may be prepared by dissolving ethylene/vinyl acetate copolymers, e.g. in tertiary butanol as solvent, then adding the graft monomers, for example styrene and acrylonitrile, as well as an $\alpha$-olefin as molecular weight regulator, starting the polymerisation reaction by the addition of a radical forming agent and heating, and when polymerisation has been terminated isolating the polymer by steam distillation.

The molecular weight regulators used are preferably monoolefins having 2 to 18 C atoms which have a double bond in an end position. Propylene and isobutylene are mentioned as examples.

Instead of carrying out a pure solution polymerisation, polymerisation may first be carried out in a reverse emulsion (water is emulsified in the monomer-polymer mixture) and when a certain proportion of monomer has been polymerised, the reverse emulsion may be converted into a suspension of the prepolymer in water by further addition of water and polymerisation may then be completed in this suspension.

It is often advantageous to carry out an additional subsequent cross-linking reaction on the graft copolymer, for example by means of oxides such as ditertiary butyl peroxide or dicumyl peroxide or by irradiation with actinic light.

Brittle thermoplastic resins within the meaning of this invention are in particular copolymers of acrylonitrile and/or methacrylonitrile on the one hand and styrene and/or its derivatives on the other. The styrene derivatives are in particular styrenes which are substituted by alkyl(preferably $C_1$-$C_6$) or halogen (preferably chlorine) in the nucleus and/or by alkyl (preferably methyl) in the $\alpha$-position of the side chain. Examples are 4-methylstyrene, $\alpha$-methylstyrene and 4-chlorostyrene.

The resins may be prepared in solution. Suitable solvents are e.g. tetrahydrofuran, dimethylformamide, hexamethylphosphoric acid triamide, acetone, acetic acid esters and aromatic solvents such as benzene, toluene or chlorobenzene. They may also be prepared by suspension polymerisation in an aqueous or organic continuous phase. Organic solvents particularly suitable for this purpose are alcohols such as methanol, ethanol or tert.-butanol.

The preferred conditions for carrying out the polymerisation are solvent-free polymerisation and polymerisation in emulsion. The intrinsic viscosities of the copolymers determined in dimethylformamide at 25° C are preferably from $[\eta] = 0.5$ to $[\eta] = 10.5$.

It is preferred to use copolymers of styrene and acrylonitrile which have been obtained by emulsion, suspension or solvent-free polymerisation and which have intrinsic viscosities in the range of $[\eta] = 0.5$ to $[\eta] = 2.0$ determined in dimethylformamide at 25° C. The ratio of styrene to acrylonitrile in the copolymers may advantageously be in the region of the azeotropic mixture of styrene and acrylonitrile although any desired composition which will still result in fluid polymers may theoretically be used.

Styrene-acrylonitrile copolymers which have been prepared in the presence of aliphatic α-olefines may also be used.

The moulding composition according to the invention is generally obtained by vigorously mixing the polycarbonates, graft copolymers and resins. Any known mixing processes may be employed for this purpose although preferably the constituents of the moulding composition are extruded together through an extruder screw in the required proportions.

Alternatively, solutions of the three components of the moulding composition in suitable solvents may be mixed together. Suitable solvents for this purpose are e.g. chlorinated aliphatic and aromatic hydrocarbons such as methylene chloride, chloroform, tetrachloroethylene and chlorobenzene or tetrahydrofuran or dimethylformamide. The moulding composition may then be isolated from the solutions by evaporation of the solvents or precipitation with non-solvents. Suitable non-solvents are e.g. alcohols such as methanol, ethanol and isopropanol.

Compared with the moulding composition of the Main Patent, the moulding composition according to the invention has substantially improved fluidity and also has numerous improved mechanical properties, for example hardness, flexural strength and modulus of elasticity.

The moulding composition according to the invention is suitable for the production of moulded articles of all kinds and the production of films and threads.

The parts given in the following Examples are parts by weight and the percentages are percentages by weight.

Preparation of a styrene-acrylonitrile copolymer 4660 g of styrene, 1530 g of acrylonitrile, 50 l of water, 600 g of sodium alkyl sulphonate having 12 to 14 C atoms in the side chain, 0.2 g of Mohr's salt, 6 ml of normal sulphuric acid, 2.1 g of sodium pyrosulphite and 12.6 g of ammonium peroxy disulphate are introduced into a 127 l stirrer equipped autoclave under nitrogen. 1800 g of propylene are then forced into the autoclave and the temperature is raised to 60° C. The mixture is stirred for 20 minutes at 60° C and the following solutions are then added:

A. 18.65 kg of styrene and 6.18 kg of acrylonitrile,
B. 8.4 g of sodium pyrosulphite and 120 g of sodium alkyl sulphonate made up to 3 l with water,
C. 50.4 g of ammonim peroxidisulphate made up to 3 l with water.

Solutions A, B and C are pumped in during 3 hours. The autoclave contents are then stirred for one hour at 60° C and the emulsion is precipitated with salt solution. After the precipitate has been washed and dried, 26.3 kg of a styrene-acrylonitrile copolymer consisting of 77.9% of styrene, 22.0% of acrylinitrile and approximately 0.1% of propylene are obtained. The intrinsic viscosity [η] determined at 23° C in dimethylformamide is 3.40.

Preparation of graft copolymers of styrene and acrylonitrile on an ethylene/vinyl acetate copolymer:

Example A 1000 g of an ethylene/vinyl acetate copolymer with a vinyl acetate content of 45% are dissolved in 960 g of styrene at 80° C in a 12 l autoclave equipped with an anchor impeller stirrer. To this solution are added 318 g of acrylonitrile, 250 ml of a 10% dispersing solution (dispersing agent is a 1:1 copolymer of methacrylic acid and methyl methacrylate, pH of dispersing solution: 6.5), 2500 ml of water and 0.8 g of sodium pyrosulphite. The reaction mixture is heated to 140° C under the protection of a nitrogen atmosphere. It is stirred for 30 minutes at 140° C and a solution of 8 g of di-(tert.-butyl) peroxide in 80 g of allyl acetate is then added during one hour, followed by a solution of 8 g of sodium hydrogen phosphate and 1.5 g of a sodium alkyl sulphonate having 12 to 14 C atoms in the alkyl chain in 2000 ml of water within 2 hours. Stirring is continued for a further 4 hours at 140° C after both solutions have been added. After removal of residual monomers and careful washing, 1600 g of a bead polymer containing 13.0% of acrylonitrile, 62.5% of ethylene/vinyl acetate copolymer and 24.5% of styrene are obtained.

Example B

A solution of 8.25 l of water, 726 g of 10% dispersing solution of the sodium salt of a 1:1 copolymer of methacrylic acid and methyl methacrylate and 2.6 g of sodium pyrosulphite is prepard in a 40 l autoclave which is equipped with an anchor agitator designed to conform to the bottom of the autoclave. The autoclave is sealed and flushed three times with nitrogen and the contents are heated to 80° C. A solution of 4160 g of styrene, 1380 g of acrylonitrile and 1780 g of an ethylene/vinyl acetate copolymer which has a vinyl acetate content of 45% are then pumped into the autoclave within 10 minutes and the autoclave contents are stirred for one hour at 80° C. Two solutions, one of 8.25 g of tert.-butyl perpivalate in 400 g of allyl acetate and the other of 13 g of Mersolat K 30 (C 12-alkyl sulphonate) in 6.6 l of water are then pumped in simultaneously and continuously at the same temperature during 2 hours. The autoclave contents are then stirred for 4 hours at 80° C. After cooling, the pressure in the autoclave is released and the bead polymer obtained is separated from the aqueous phase by suction or centrifuging and then freed from residual monomers by treatment with steam. 5610 g of a bead polymer having an average particle size of 600 μm and composed of 29.8% of ethylene/vinyl acetate copolymer, 15.2% of acrylonitrile and 55% of styrene are obtained after drying. The intrinsic viscosity in dimethylformamide at 23° C is 2.46.

Example C 6000 g of an ethylene/vinyl acetate copolymer having a vinyl acetate content of 45% are dissolved in 16 l of tertiary butanol at 80° C in a 40 l stirrer autoclave. 500 g of propylene are then added. A solution of 5000 g of styrene, 1850 g of acrylonitrile, 1500 ml of tert.-butanol and 20 tert.-butyl peroctoate is then added continuously during 5 hours under an atmosphere of nitrogen with stirring and the reaction temperature is kept constant at 80° C. The autoclave contents are then stirred for 3 hours at 80° C, one hour at 100° C and 3 hours at 120° C. The solvent and residual monomers are removed with steam. 11.1 kg of a graft polymer which is soluble in chlorobenzene at 120° C and contains 12.5% of acrylonitrile and 54% of ethylene/vinyl acetate copolymer are obtained after drying. The melt index determined at 190° C and 2.16 kp pressure is 0.5 g/10 min.

on rollers at 180° C, using the proportion indicated in the Table for Examples 1 to 6. The granulate obtained from the rolled sheets was moulded in an injection moulding machine at a reaction temperature of about 270° C to produce test samples.

The following Table shows some mechanical short term values of Examples 1 to 6.

| Property | Test method | Measuring unit | 1 | 2 | 3 | 4 | 5 | 6 |
|---|---|---|---|---|---|---|---|---|
| Impact strength RT | DIN 53 453 | kJ/m² | unb. | unb. | unb. | unb. | unb. | unb. |
| −40° C | | | 101 | 6/123 | 3/85 | 40 | 60 | |
| Notched impact strength RT | DIN 53 453 | kJ/m² | 6 | 11 | 29 | 36 | 29 | unb. |
| −40° C | | | 3 | 3 | 3 | 3 | 3 | 3 |
| Flexural strength σbF | DIN 53 452 | N/mm² | 102 | 101 | 94 | 72 | 76.5 | 72 |
| Sagging f Bending | DIN 53 452 | mm | 4.5 | 4.6 | 4.6 | 5.0 | 5.0 | 5.0 |
| E-modulus | DIN 53 452 | N/mm² | 2600 | 2500 | 2400 | 2000 | 2100 | 1800 |
| Ball pressure hardness after 30 s H$_K$30 | DIN 53 456 | N/mm² | 114 | 103 | 95 | 69 | 73.5 | 68.5 |
| Dimensional stability under heat according to Vicat (B) | DIN 53 460 | ° C | 110 | 110 | 110 | 103 | 103 | 95 |
| Ethylene/vinyl acetate content | | % | 6.25 | 9.4 | 12.5 | 13.6 | 13.6 | 13 | unb.: unbroken
3/85: of 10 standard test rods tested, 3 broke when subjected to an impact of 85 kJ/m², the rest remained unbroken.

| Examples 1–6: | | | | | | |
|---|---|---|---|---|---|---|
| Example | 1 | 2 | 3 | 4 | 5 | 6 |
| Polycarbonate (%) | 40 | 40 | 40 | 40 | 40 | 40 |
| Styrene/acrylonitrile copolymer (%) | 50 | 45 | 40 | 14 | 14 | 36 |
| Graft copolymer (%) | 10 | 15 | 20 | 46 | 46 | 24 |
| Ethylene/vinyl acetate copolymer content (%) of the graft copolymer | 62.5 | 62.5 | 62.5 | 29.8 | 29.8 | 54 |

The polycarbonate used in Examples 1 to 6 was prepared from 4,4′-dihydroxydiphenylpropane-2,2 and has a relative viscosity of 1.28 determined on a solution of 0.5 g of polycarbonate in 100 ml of methylene chloride at 25° C.

The method of preparing the styrene/acrylonitrile copolymer used has already been described; only in Example 5 a SAN copolymer which consisted of 72% of styrene and 28% of acrylonitrile and which had a K-value of 60 was used.

The graft copolymers of styrene and acrylonitrile on an ethylene/vinyl acetate copolymer were described in Examples A, B and C.

The thermoplastic moulding composition of polycarbonate, styrene-acrylonitrile copolymer and graft copolymer of styrene and acrylonitrile on an ethylene/vinyl acetate copolymer was prepared by vigorous mixing

We claim:
1. A thermoplastic moulding composition comprising
   1. from 5 to 95% by weight, based on component (1) and (2), of a polycarbonate of a divalent phenol,
   2. from 95 to 5% by weight, based on component (1) and (2), of a graft copolymer comprising
      a. at least one monovinyl aromatic compound,
      b. acrylonitrile, an acrylonitrile derivative or a mixture thereof and optionally
      c. an α-olefin on an ethylene/vinyl acetate copolymer as a graft substrate, and
   3. from 10 to 50% by weight, based on the total moulding composition, of a brittle thermoplastic resin which is a copolymer of
      i. acrylonitrile, methacrylonitrile or any mixture thereof and
      ii. styrene, a styrene derivative or any mixture thereof.
2. A thermoplastic moulding composition as claimed in claim 1, in which the styrene derivative of (ii) is styrene substituted by alkyl or chlorine in the nucleus.
3. A thermoplastic moulding composition as claimed in claim 1, in which the thermoplastic resin has an intrinsic viscosity from 0.5 to 10.5, determined in dimethylformamide at 25° C.

* * * * *

Disclaimer 4,028,433.—*Richard Prinz*, Leverkusen; *Salah Elabd Elghani*, Duesseldorf; *Windried Fischer*, Cologne and *Heinrich Alberts*, Cologne, Germany. THERMOPLASTIC MOULDING COMPOUNDS. Patent dated June 7, 1977. Disclaimer filed Sept. 7, 1982, by the assignee, *Bayer Aktiengesellschaft.*

Hereby enters this disclaimer to all claims of said patent.
[*Official Gazette October 26, 1982.*]